United States Patent [19]
Keller et al.

[11] Patent Number: 6,160,560
[45] Date of Patent: Dec. 12, 2000

[54] GRAPHIC REQUEST MANAGEMENT SYSTEM

[75] Inventors: James A. Keller, Santa Clara; Kevin J. Flory, Livermore, both of Calif.

[73] Assignee: Diamond Multimedia Systems, Inc., San Jose, Calif.

[21] Appl. No.: 09/131,898

[22] Filed: Aug. 10, 1998

[51] Int. Cl.[7] ...................................................... G06F 15/16
[52] U.S. Cl. .......................... 345/503; 345/509; 345/522; 345/196; 709/323
[58] Field of Search ...................................... 345/501–503, 345/507–509, 513, 515, 516, 522, 196; 709/321–323, 327, 328

[56] References Cited

U.S. PATENT DOCUMENTS

| | | | |
|---|---|---|---|
| 5,251,322 | 10/1993 | Doyle et al. | 395/507 |
| 5,734,387 | 3/1998 | Patrick et al. | 345/441 |
| 5,831,637 | 11/1998 | Young et al. | 345/501 |

*Primary Examiner*—Kee M. Tung
*Attorney, Agent, or Firm*—Gerald B. Rosenberg; New Tech Law

[57] ABSTRACT

The invention is a method and apparatus of a graphic request management system which provides for storing in the header of bitmaps indicative of the last time a bitmap was included in a request as a destination or source bitmap. Where the system determines that a request is to be processed by a graphic coprocessor, the system updates the bitmap headers of the bitmaps included in that request when that request is stored in the queue of the graphic coprocessor. Where the system determines that a request is to be processed by the CPU, the system holds that request until the last operation on any bitmap included in that request, which could effect the results of the request, has been completed by the graphic coprocessor. The request, if only containing source bitmaps, is processed by the CPU immediately after the completion of any writing into all of the source bitmaps due to request stored in the queue. The request, if containing source and destination bitmaps, will be processed by CPU immediately after the completion of any writing in any source bitmap and any writing in or reading of any destination bitmap included in the request by graphic coprocessor due to any preceding request stored in the queue. The system does not have to wait until all requests stored in queue are processed by coprocessor before a request can be processed by CPU.

12 Claims, 4 Drawing Sheets

GRAPHIC REQUEST MANAGEMENT SYSTEM

BACKGROUND

1. Field of the Invention

The invention relates generally to display drivers and more specifically to the management of a request to a display driver where the display driver determines if the request will be processed by a central processing unit CPU or by a graphic coprocessor.

2. Description of the Related Art

Graphics operations are centered around the concept of a bitmap. A bitmap is a two dimensional rectangular array of pixels. The bitmap can be a rectangular area on the screen or it may be in a portion of memory that is not visible. Each bitmap includes a bitmap header containing a plurality of fields which describes the bitmap in some detail. The bitmap header has a first field which defines where the bitmap is located via a memory bits pointer, a second field which defines the bitmap width as a number of pixels, and a third field which defines the bitmap height as a number of pixels. These three fields of the bitmap header and several other fields (which are not directly relevant here) are always present. Other fields may be added as desired for the private use of the display driver. These additional fields are not interpreted by the system in any way. The system simply passes them around with the rest of the bitmap header.

Graphics operations are performed by the display driver. The display driver receives a call from the system with a request to perform some operation on a bitmap. For example, the display driver may receive a request to copy a portion of one bitmap to another bitmap, or a request is made to set some region within a bitmap to black (all pixels in the region of the bitmap are set the value zero). In a more complicated sort of graphics operation, it is possible that several sources or input bitmaps may be combined in some way and the result written to some destination or output bitmaps. In a case like this, source bitmaps are only read, that is they are not modified in any way, and destination bitmaps may be read and will definitely be written to and modified.

At present, graphic environments generally allow a request to have:

a) only one destination bitmap;

b) no source bitmaps, for example in the case of clearing all the destination bitmap pixels to a single value;

c) one source bitmap as in copying from one bitmap to another; and d) two source bitmaps to be combined in a variety of ways where the original source bitmaps are read but not altered and the combined bitmap is written to a destination bitmap.

The display driver prefers to use a graphics coprocessor to perform the requested task rather than having the CPU perform the task, since using the graphics coprocessor will, in general, be much faster and will allow both the graphic coprocessor and the CPU to perform operations simultaneously. Where the requested graphic task can be done faster by the CPU or cannot be done by the graphic coprocessor, then the display driver causes the CPU to perform that task. When the system makes a request of the display driver to perform a graphics operation, the display driver looks at the request and makes the determination as to whether the graphics coprocessor or the CPU will handle the request. If the graphics coprocessor can handle the request, then the request is placed at the tail of a graphics coprocessor's queue and the display driver returns to the system indicating that the request has been entered into the queue but not that the request has been executed. The graphics coprocessor continually pulls one request at a time from the head of the queue and executes that request. This is done in order that the requested sequence of reading and/or writing of bitmaps is maintained. When there is no request in the queue, the graphic coprocessor does nothing until a request is placed in the queue.

If the display driver determines that the CPU must handle the request, the display driver cannot immediately start performing the graphics operation on the bitmap requested using the CPU because there may be an operation for that same bitmap in the graphics coprocessor queue (from some prior request) which has not yet executed. If the CPU is allowed to immediately perform the requested graphic operation, then the order of operations for that bitmap may not be maintained and in general the bitmap will not have the correct image in it anymore. The present solution for this problem is whenever the display driver receives a request where it is determined that the operation is to be done with the CPU, the display driver prevents any new request from being stored in the coprocessor's queue and waits until all requests stored in the coprocessor's queue have been completed. The request to be performed by the CPU is then executed by the CPU. This procedure maintains the integrity of the results on the status of the bitmaps that were subject of operations to be performed for requests stored in the graphics coprocessor's queue when a request, determined to be processed by the CPU, is received by the device driver.

SUMMARY OF THE INVENTION

It is therefore an object of the invention for the display driver to manage requests such that when the display driver ascertains that the CPU should process a request involving one or more target bitmaps, the request will be processed by the CPU after the last request presently in the queue for those target bitmaps has been completed rather than waiting for all requests in the queue for all bitmaps to be processed. If the only work left for the graphics coprocessor is to different bitmaps than the target bitmap(s) involved in the current operation that will be done by the CPU, then there will be no problems with doing the current operations associated with the request for the target bitmap(s) in parallel with other operations being performed by the graphics coprocessor for other bitmaps.

Briefly, a method and apparatus is provided that adds two extra fields to each bitmap header. The first field is a BitmapDestinationIndex (BDI) field which indicates that the bitmap is the destination of some operation that was placed in the graphics coprocessor queue (i.e., that this bitmap will be written to by the graphics coprocessor) by containing the next queue address (the first address for the next request in the queue) after the completion of a request that had that bitmap as a destination bitmap. The second field is a BitmapSourceIndex (BSI) field which indicates that the bitmap is a source of some operation in the graphics coprocessor queue (i.e., that this bitmap will only be read from by the graphics coprocessor but the bitmap will not be changed) by containing the next queue address (the first address for the next request in the queue) after the completion of a request that had that bitmap as a source bitmap. The display driver updates these two fields each time for a bitmap whenever a request is placed in the queue that involves the bitmap as a source or destination bitmap. When the display driver ascertains that the request is to be processed by the CPU, the display driver interrogates the headers of all bitmaps associated with the request. The display driver ascertains the highest queue address of the queue addresses located in the BitmapSourceIndex and the BitmapDestinationIndex fields of the destination bitmaps and the BitmapDestinationIndex field of the source bitmaps involved for that request and saves that highest queue address as the CPU target queue address. The display driver compares the CPU target queue address with the queue address for the operation presently being processed by the graphics coprocessor which is located in the queue address register within the graphics coprocessor. Where the queue address in the queue address register is higher or equal to the CPU target queue address, then the display driver allows the CPU to perform the request and provides a return to the system such that further requests can be stored into the graphics coprocessor's queue. Where the queue address in the queue address register is lower than the CPU target queue address, then the display driver monitors the queue address register and, when the queue address in the queue address register is equal to the CPU target queue address, then the display driver allows the CPU to perform the request and provides a return to the system such that further requests can be stored into the graphics coprocessor's queue.

An advantage of the present invention is an increase in speed for processing a series of requests to a display driver where the requests are processed either by a graphics coprocessor or by the system CPU as determined by the display driver.

BRIEF DESCRIPTION OF THE DRAWINGS

The below detailed description makes reference to the accompanying drawings, in which.

DETAILED DESCRIPTION

Figure 1:
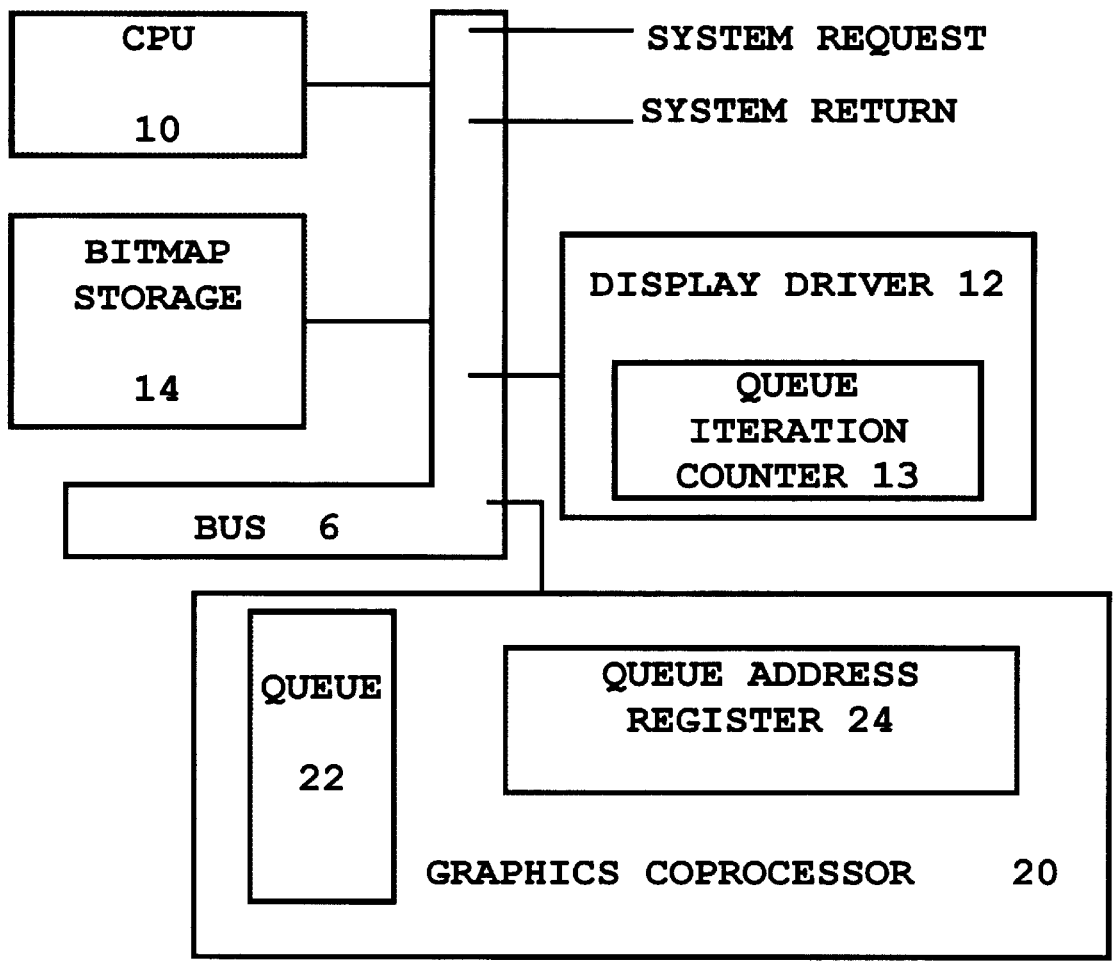
FIG. 1 is a block diagram of the system components of the invention.

FIG. 1 shows the interrelationship between the components of the queue management system comprising the invention. As it is well understood by those skilled in the art, a computing system containing graphic capabilities will comprise in part a system computer processing unit CPU 10, a bitmap storage unit 14 for storing a plurality of bitmaps, a graphic coprocessor 20 for processing requests, a display driver 12 for managing all display requests from the system, and a bus 6 which interconnects all of the heretofore referenced components. The graphic coprocessor 20 includes a queue 22 for storing a plurality of requests. A request when stored in the queue 22 will occupy one or more sequential addresses in the queue 22. A typical queue 22 can have 250,000 address locations. The graphic coprocessor 20 also contains a queue address register 24 which holds the queue address for the queue location whose entry is presently being processed by the graphic coprocessor. The queue address register 24 can be read by the display driver 12. In operation, the graphic coprocessor 22 sequentially performs the sequence of requests in the order in which the requests were stored in the queue 22 and within each request the order that operations for that request was stored in queue 22. The queue 22 can be thought of as a list of requests where each request occupies one or more queue locations, where the list has a head and a tail. Coprocessor 20 executes the request at the head of a list and display driver 12 enters new requests at the tail of the list. When the queue reaches the highest address, the next operation for a request will be written at the lowest queue address forming a circular queue. Therefore the queue 22 should be of sufficient size that any operation of a request stored into the queue will not be overwritten until after that operation has been completed. It is therefore possible for a queue having 250,000 locations, that a request could be stored for example starting in address 249,050 and ending in address 000,100. The queue address register 24 is a binary counter designed to count up to the size of the queue and then reset to zero. In order to uniquely identify an operation in queue 22, a queue iteration counter 13 is provided within the display driver 12 for counting the cycles of the queue address register 24 starting with a cycle value of one. The combination of the value in queue iteration counter 13 and the queue address register 24 form a non repetitive effective queue address for the sequence of entries in a circular queue such as queue 22. When the queue iteration counter reaches its highest value, the display driver 12 will not allow the system to store any more requests until the queue 22 is empty and at that time will reset both the queue iteration counter 13 and the queue address register 22 to zero.

Maintaining the sequence of operations on a bitmap is of prime importance. When a request is stored in the queue, that request should not be performed until all earlier requests that would read or write into that bitmap have been completed. A read request of a bitmap should read that bitmap as it would exist after all previous stored queue operations for that bitmap have been completed. Similarly, a write request into a bitmap should only alter that bitmap as that bitmap would exist after all previous stored queue operations for that bitmap have been completed.

Figure 2:
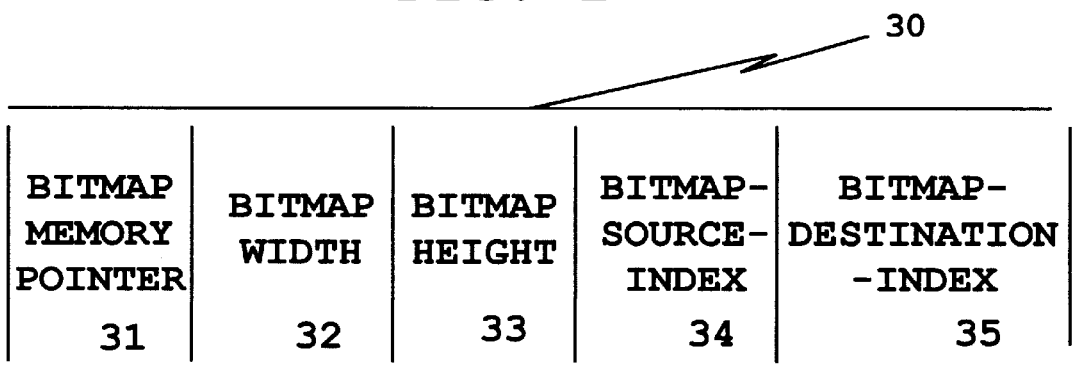
FIG. 2 is an illustration of a header of a bitmap as modified by the invention.

Referring to FIG. 2, the header 30 of all bitmaps is modified to include, in addition to Bitmap Memory Pointer field 31, Bitmap Width field 32 and Bitmap Height field 33, two additional fields, i.e., a BitmapSourceIndex (hereinafter referred to as "BSI") field 34 and a BitmapDestinationIndex (hereinafter referred to as "BDI") field 35. The BDI field 35 for a given bitmap contains the first queue address, comprising the values of the queue iteration counter 13 and the queue address requester 22, of a request immediately following the last request stored in the queue 22 that indicated that bitmap as a destination bitmap. The BSI field 34 for a given bitmap contains the first queue address, comprising the values of the queue iteration counter 13 and the queue address requester 22, of a request immediately following the last request stored in the queue 22 that indicated that bitmap as a source bitmap.

Figure 3A:
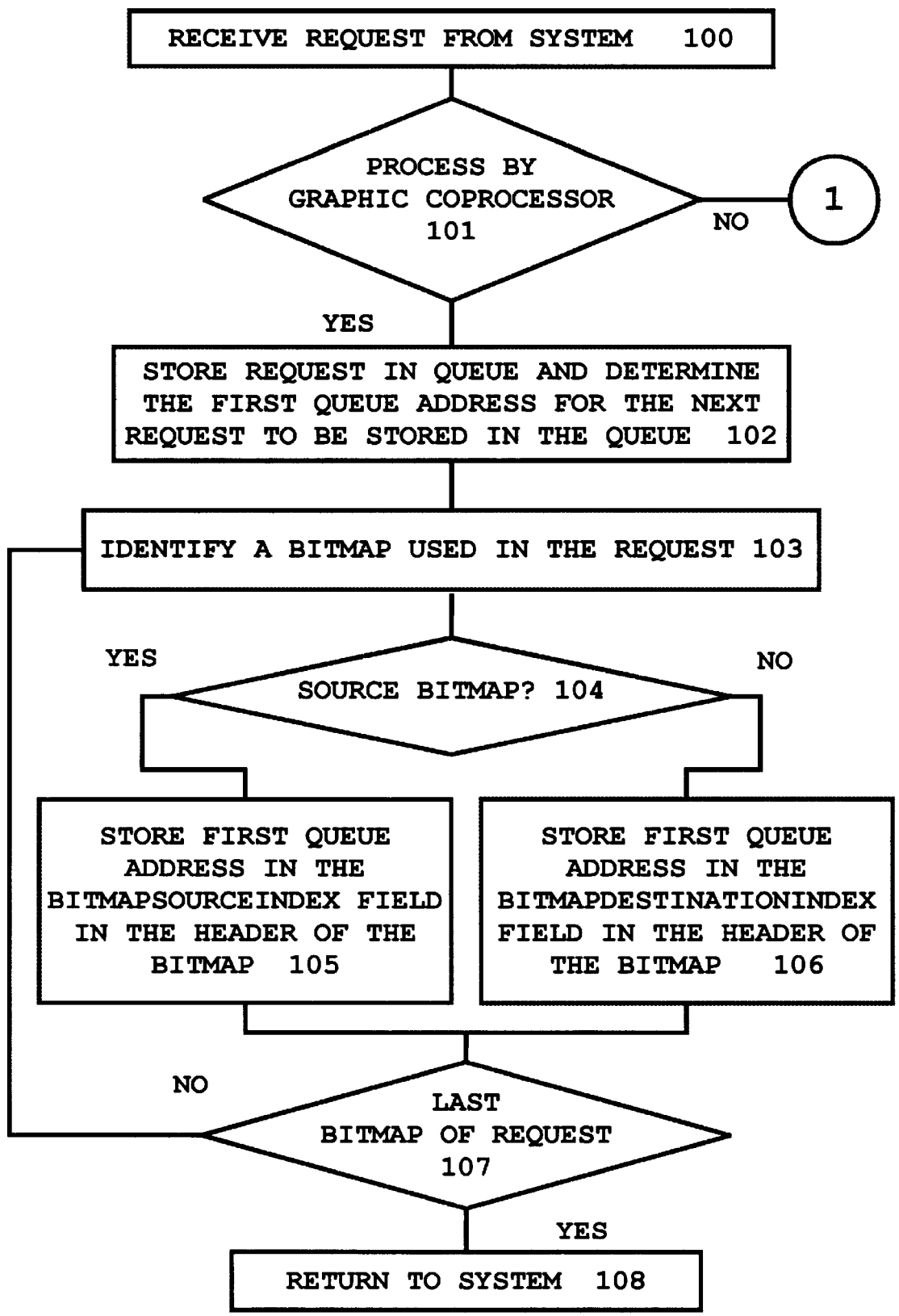
FIGS. 3A, 3B and 3C are flow charts showing the method practiced by the invention.
Figure 3B:
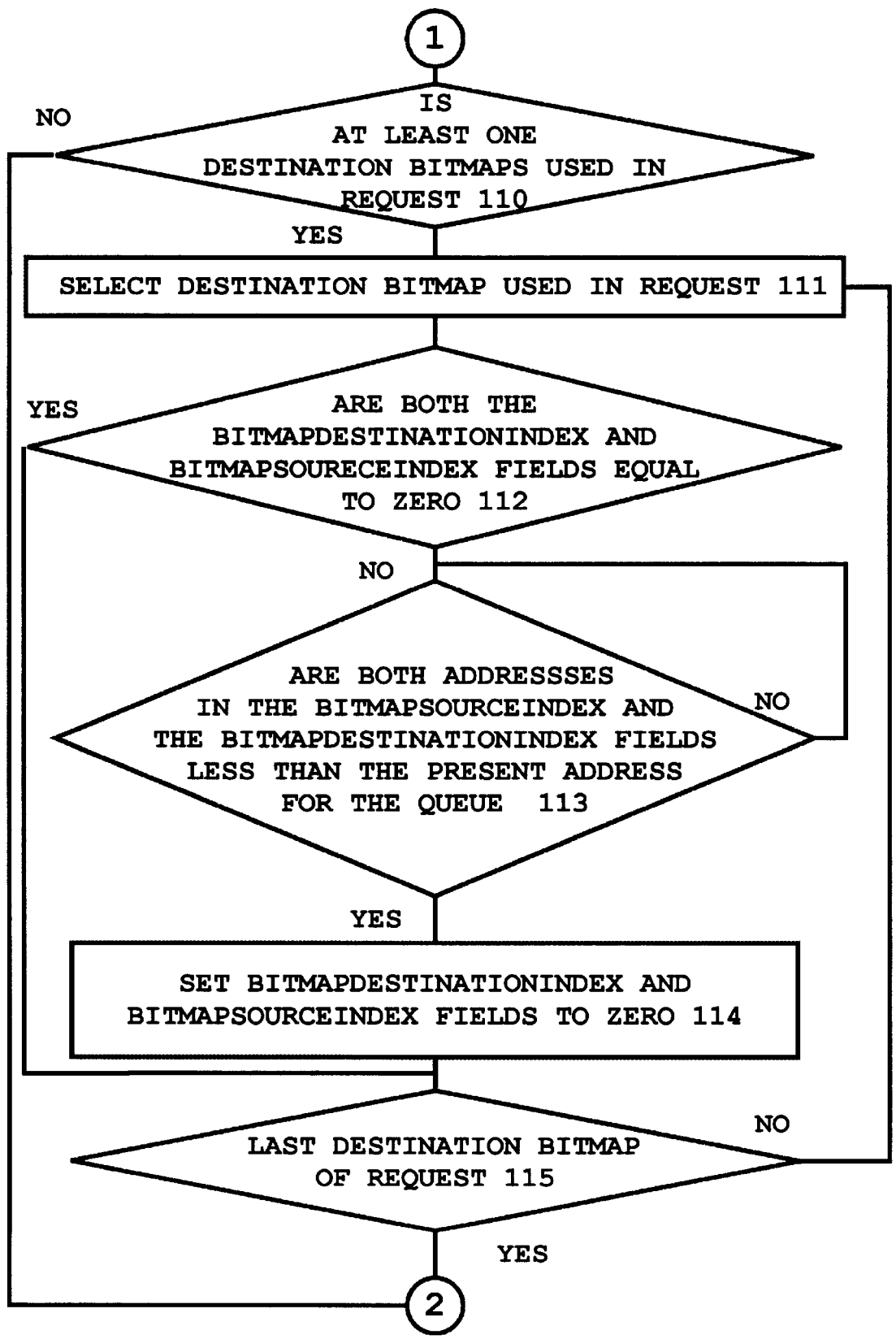
Figure 3C:
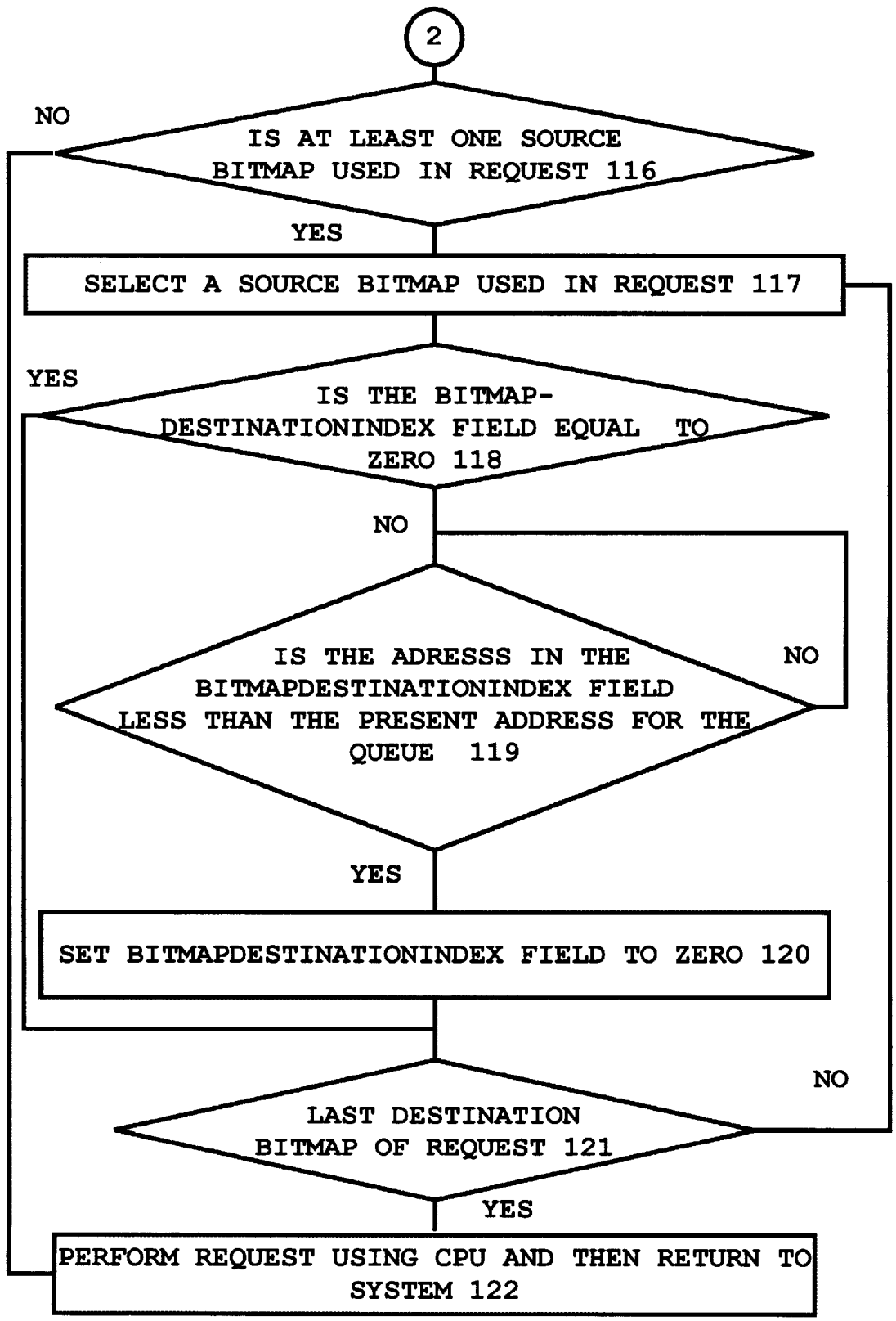

In managing requests received from the system, display driver 12 performs the processes as shown in the flow chart of FIGS. 3A, 3B and 3C.

Referring to FIG. 3A, in step 100 a request is received by the display driver 12 from the system and the display driver 12 in step 101 determines if that request is to be performed by the graphic coprocessor 20 or by CPU 10.

Where the graphic coprocessor 20 is to perform the request, display driver 12 in step 102 will store that request at the tail of the queue 22 and will determine the first queue address (hereinafter referred to a "FQA"), comprising the values of the queue iteration counter 13 and the queue address requester 22, of the request that will immediately follow the request just stored in the queue 22.

The display driver 12 will next modify the headers of each bitmap which are part of the request just stored in queue 22.

In step 103, display driver 12 determines from the just stored request the identity of a bitmap included in that request and in step 104 whether that bitmap is a source bitmap in that just stored request. Where the identified bitmap is a source bitmap, the display driver 12 in step 105 will cause the FQA to be stored in the BSI field 34 of the header 30 for the identified bitmap which is presently stored in the bitmap storage 14. Where the identified bitmap is not a source bitmap but rather a destination bitmap, the display 12 in step 106 will causes the FQA to be stored in the BDI field 35 of the header 30 for the identified bitmap which is presently stored in the bitmap storage 14. Where the identified bitmap is both a source bitmap and a destination bitmap, the display 12 in step 106 will cause the FQA to be stored in the BDI field 35 and the BSI field 34 of the header 30 for the identified bitmap which is presently stored in the bitmap storage 14.

In step 107, display driver 12 will determine if there are other bitmaps included in the request for which display driver 12 has not performed steps 103, 104, and either 105 or step 106 hereon. Display driver 12 will process each bitmap included in the just stored request and then in step 108 will return to the system allowing the system to send another request to the display driver 12.

When the display driver 12 determines that the just received request is to be performed by the CPU 10, the display 12 branches from step 101 to step 110 on FIG. 3B. The just received request to be performed by the CPU 10 cannot be performed until all requests stored in queue 22 that include any bitmap that is included in the just received request have been completed.

Display driver 12 at step 110 determines if any of the bitmaps included in the just received request are designated as a destination bitmap. At present, a request is normally limited to include only one destination bitmap, however, it is contemplated that in the future a request may contain more than one destination bitmap and, therefore the disclosed process deals with the situation of a request possibly including more than one destination bitmap.

Where no destination bitmap is included in the just received request, the process branches to step 116 in FIG. 3C. Where one or more destination bitmap(s) is included in the just received request, display driver 12 selects in step 111 a destination bitmap and determines in step 112 whether both the BDI field 35 and the BSI field 34 for that selected destination bitmap have a value of zero. A zero value in both the BDI field 35 and the BSI field 34 of a bitmap indicates that there are no pending requests stored in queue 22 for that bitmap. If the value of both BDI field 35 and BSI field 34 are zero, no further action regarding that destination bitmap is needed and the process branches to step 115. If the value of either BDI field 35 and BSI field 34 are non zero, then in step 113 the display 12 compares the addresses stored in the BDI field 35 and BSI field 34 with the present queue address as represented by the present values of the queue iteration counter 13 and the queue address register 24. Where either of the addresses stored in BDI field 35 and BSI field 34 is greater than the present queue address, the process will cycle at step 113 until the addresses in both BDI field 35 and BSI field 34 are less than the present queue address and then the process will go to step 114. When all operations in all requests stored in queue 22 for that destination bitmap have been completed, then the addresses for both the BDI field 35 and the BSI field 34 will be less than the present queue address. In step 114, the display 12 sets the value of the BDI field 35 and the BSI field 34 to zero, indicating that no present operations for any request stored in queue 22 contains any operation for that bitmap that have not been completed. In step 115, the display 12 determines if there are any unprocessed destination bitmaps included in the just received request and, if so, processes each of those remaining destination bitmaps through steps 111, 112, 113, and 114, and then proceeds to step 116 in FIG. 3C.

Display driver 12 at step 116 determines if any of the bitmaps included in the just received request are designated as a source bitmap. At present, a request may contain more than one source bitmap.

Where no source bitmap is included in the just received request, the process branches to step 122. Where one or more source bitmap(s) is included in the just received request, display driver 12 selects in step 117 a source bitmap and determines in step 118 whether the BDI field 35 for that source bitmap has a value of zero. A zero value for the BDI field 35 indicates that this bitmap is not designated as a destination bitmap by any request presently stored in the queue 22, and the process branches to step 121. If the value of the BDI field 35 is non zero, then in step 119 the display driver 12 compares the addresses stored in the BDI field 35 with the present queue address as represented by the present values of the queue iteration counter 13 and the queue address register 24. Where the address stored in the BDI field 35 is greater than the present queue address, the process will cycle at step 119 until the address in the BDI field 35 is less than the present queue address and then the process will go to step 120. When the address in the BDI field 35 is less than the present queue address, all operations in all requests stored in queue 22 that would have modified that source bitmap will have been completed. In step 120 the display driver 12 sets the value of the BDI field 35 to zero, indicating that no present operation that would modify that bitmap for any request stored in queue 22 is pending. In step 121 the display driver 12 determines if there is any unprocessed source bitmap included in the just received request and, if so, processes each of those remaining source bitmaps through steps 117, 118, 119, and 120, and then proceeds to step 122.

At this time all operations for any bitmap included in the just received request that is to be performed by CPU 10 that would have an effect on the processing of the just received request are completed such that the just received request may be now processed by the CPU 12. At step 122 the display driver 12 returns to the system allowing the system to send requests to the display driver 12 and simultaneously processes the just received request by CPU 10. In some instances display driver 12 returns to the system and the system controls the CPU 10 to perform the just received request.

In summary, the graphic request management system provides for storing in the header 30 of bitmaps stored in the bitmap storage 14 data indicative of the last time a bitmap was included in a request as a destination or source bitmap. The system determines whether a request is to be processed by the graphic coprocessor 20 or by CPU 10. Where the system determines that a request is to be processed by the graphic coprocessor 20, the system updates the bitmap headers of the bitmaps included in a request when that request is stored in the queue 22 of the graphic coprocessor 20. Where the system determines that a request is to be processed by the CPU 10, the system holds that request until the last operation on any bitmap included in that request which could affect the results of the request has been completed by the graphic coprocessor. The request, if only containing source bitmaps, will be processed by CPU 10 immediately after the completion of any writing into all of the source bitmaps by graphic coprocessor 20 due to any preceding request stored in the queue 22. The request, if containing source and destination bitmaps, will be processed by CPU 10 immediately after the completion of any writing in any source bitmap and any writing in or reading of any destination bitmap included in the request by graphic coprocessor 20 due to any preceding request stored in the queue 22. The system does not have to wait until all requests stored in queue 22 are processed by coprocessor 20 before a request can be processed by CPU 10.

The sequence of steps as set forth may be changed. For example the treatment of source bitmaps may be performed prior to the treatment of destination bitmaps. Further the term "system" as the source of requests is used in its broadest sense and is meant to include any source that may send a request to a display driver.

While the invention has been particularly shown and described with reference to the preferred embodiments thereof, it will be understood by those skilled in the art that changes in form and detail may be made therein without departing from the spirit and scope of the invention. Given the above disclosure of general concepts and specific embodiments, the scope of the protection sought is defined by the following claims.

What is claimed is:

1. A graphic request management system within a data processing system having graphic capabilities, said data processing system including a central processing unit, a graphic coprocessor including a queue and a queue address register and a storage for storing a plurality of bitmaps where each bitmap includes a header consisting of a plurality of fields, said graphic request management system comprising:

first means for receiving a request and for determining if said received request is to be processed by said graphic coprocessor or by said central processing unit;

second means for changing the header of bitmaps stored in said storage by storing data in said fields of said header of all bitmaps included in said received request when said received request is stored in said queue for processing by said graphic coprocessor, said data stored in said field in said header of each of said bitmaps indicating the last time said bitmap was included in a request as a destination bitmap and as a source bitmap and stored in said queue;

third means for holding said received request to be processed by said central processing unit until the last operation on any bitmap included in said received request, which could affect the results of said received request, has been completed by the graphic coprocessor such that said received request can be processed by the central processing unit without requiring that all requests stored in said queue be processed by said graphic coprocessor before said received request can be processed by said central processing unit.

2. The graphic request management system of claim 1 wherein said third means further comprises:

fourth means for releasing said held received request when said held received request contains only source bitmaps to said central processing unit for processing upon the completion of a last change to said source bitmap(s) by said graphic coprocessor in response to requests stored in said queue; and fifth means for releasing said held received request when said held received request contains both source bitmaps and destination bitmaps to said central processing unit for processing upon completion of a last change to said source bitmaps and said destination bitmaps by said coprocessor and the reading of said source bitmaps by said coprocessor in response to requests stored in the queue.

3. The graphic request management system of claim 1 wherein said second means further comprises:

a sixth means for storing in a BitmapSourceIndex field in said header of all source bitmaps included in said received request source data indicative of the beginning of the next request to be stored in said queue immediately following said stored received request in said queue; and a seventh means for storing in a BitmapDestinationIndex field of all destination bitmaps included in said received request destination data indicative of the beginning of the next request to be stored in said queue immediately following said stored received request in said queue.

4. The graphic request management system of claim 1 wherein said third means further comprises:

an eighth means for storing a zero value in a BitmapDestinationIndex field in said header of each source bitmap included in said received request; and a ninth means for storing a zero value in a BitmapSourceIndex field and a BitmapDestinationIndex field in said header of each destination bitmap included in said received request.

5. The graphic request management system of claim 1, 2, 3 or 4 where said queue is a circular queue and said queue address register contains the queue address of the entry in the queue that is presently being processed by said graphic coprocessor, said graphic request management further comprising:

a tenth means which counts the cycles of said circular queue and stores the present cycle number for said circular queue.

6. The graphic request management system of claim 5 wherein said second means further includes:

eleventh means for deriving said source data to be stored in said BitmapSourceIndex field from said present cycle number and said queue present address; and twelfth means for deriving said destination data to be stored in said BitmapDestinationIndex field from said present cycle number and said queue present address.

7. A method of managing requests in a graphic request management system within a data processing system having graphic capabilities, said data processing system including a central processing unit, a graphic coprocessor including a queue and a queue address register for storing the queue present address being accessed by said coprocessor and a storage for storing a plurality of bitmaps where each bitmap includes a header consisting of a plurality of fields, said method comprising the steps of:

a) receiving a request:

b) determining if said received request is to be processed by said graphic coprocessor or by said central processing unit;

c) branching to step g when said received request is to be processed by said central processing unit;

d) storing data in a plurality of said fields of said header of all bitmaps included in said received request where said data indicates the last time said bitmap was included in a request as a destination bitmap and as a source bitmap;

e) storing said received request in said queue;

f) branching to step i;

g) holding said received request until the last operation on any bitmap included in said received request, which could affect the results of said received request, has been completed by the graphic coprocessor;

h) processing said received request by said central processing unit without requiring that all requests stored in said queue be processed by said graphic coprocessor before said received request can be processed by said central processing unit;

i) issuing a return for permitting receipt of a new request.

8. The method of claim 7 wherein said step g further comprises the steps of:

g1) releasing said held received request when said held received request contains only source bitmaps to said central processing unit for processing upon the completion of a last change to said source bitmap(s) by said graphic coprocessor in response to requests stored in said queue; and g2) releasing said held received request when said held received request contains both source bitmaps and destination bitmaps to said central processing unit for processing upon completion of a last change to said destination bitmaps by said coprocessor and the reading of said source bitmaps by said coprocessor in response to requests stored in the queue.

9. The method claim 7 wherein step d further comprises the steps of:

d1) storing in a BitmapSourceIndex field of all source bitmaps included in said request source data which is indicative of the beginning of the next request stored in said queue immediately following a last request stored in said queue that included said bitmap as a source bitmap; and d2) storing in a BitmapDestinationIndex field of all destination bitmaps included in said request destination data indicative of the beginning of the next request stored in said queue immediately following a last request stored in said queue that included said bitmap as a destination bitmap.

10. The method of claim 9 wherein step d1 further includes the step of:

d1I) deriving said source data to be stored in said BitmapSourceIndex field from said stored cycle number and said present queue address; and wherein step d2 further includes the step of:

d2I) deriving said destination data to be stored in said BitmapDestinationIndex field from said stored cycle number and said queue present address register.

11. The method of claim 7 wherein step g further comprises the steps of:

g3) storing a zero value in a BitmapDestinationIndex field in said header of each source bitmap included in said received request; and g4) storing a zero value in a BitmapSourceIndex field and said BitmapDestinationIndex field in said header of each destination bitmap included in said received request.

12. The method of claim 7, 8, 9 or 10 wherein said queue is a circular queue, said step b further comprising the steps of:

b1) counting the cycles of said circular queue; and b2) storing a present cycle number for said circular queue.

* * * * *